(12) United States Patent
Absillis

(10) Patent No.: US 8,301,115 B1
(45) Date of Patent: Oct. 30, 2012

(54) METHOD FOR INVERSE PORT-BASED AUTHENTICATION

(75) Inventor: Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 354 days.

(21) Appl. No.: 11/370,704

(22) Filed: Mar. 8, 2006

(51) Int. Cl.
*H04M 3/16* (2006.01)

(52) U.S. Cl. .................... 455/411; 455/410; 455/552.1

(58) Field of Classification Search ............ 455/410, 455/411, 414.1, 433, 435.1, 417, 445, 557; 370/310, 328, 338
See application file for complete search history.

(56) References Cited

U.S. PATENT DOCUMENTS

| | | | |
|---|---|---|---|
| 6,307,836 B1* | 10/2001 | Jones et al. | 370/230 |
| 6,907,470 B2* | 6/2005 | Sawada et al. | 709/244 |
| 7,043,230 B1* | 5/2006 | Geddes et al. | 455/410 |
| 7,346,358 B2* | 3/2008 | Wood et al. | 455/456.1 |
| 7,784,084 B2* | 8/2010 | Ng et al. | 726/3 |
| 2002/0023160 A1 | 2/2002 | Garrett et al. | |
| 2004/0105416 A1* | 6/2004 | Rue | 370/338 |
| 2004/0174876 A1* | 9/2004 | Peirce et al. | 370/389 |
| 2005/0138351 A1 | 6/2005 | Lee et al. | |
| 2006/0121895 A1* | 6/2006 | Zou et al. | 455/433 |
| 2006/0159269 A1* | 7/2006 | Braun et al. | 380/277 |
| 2006/0271785 A1* | 11/2006 | Holtmanns et al. | 713/171 |
| 2008/0095119 A1* | 4/2008 | Bachmann et al. | 370/332 |
| 2008/0201749 A1* | 8/2008 | Liu et al. | 725/100 |

FOREIGN PATENT DOCUMENTS

| | | |
|---|---|---|
| EP | 1492381 A1 | 6/2003 |
| WO | 01/80528 A2 | 10/2001 |

* cited by examiner

*Primary Examiner* — Jean Gelin
(74) *Attorney, Agent, or Firm* — Capitol Patent & Trademark Law Firm, PLLC

(57) ABSTRACT

A service node authenticates a service provider network to which it is connected. When the service node is connected between subscriber devices and a network node of the service provider network, the service node issues an authentication request to the network node. The network node responds to the authentication request by transmitting a reply. The service node receives the reply and determines if it indicates the service provider network to which the service node is connected is authentic. These authentication communications can conform to a standard authentication protocol, such as Extensible Authentication Protocol (EAP). If the reply indicates the service provider network is authentic, the service node permits communication between the subscriber devices and the service provider network. If the reply indicates the service provider network is not authentic, the service node blocks such communication.

9 Claims, 2 Drawing Sheets

METHOD FOR INVERSE PORT-BASED AUTHENTICATION

BACKGROUND OF THE INVENTION

1. Field of the Invention

The present invention relates generally to digital networks, such as those through which services are provided to subscribers, and, more specifically, to digital network authentication processes in such networks.

2. Description of the Related Art

Digital service providers are using their networks to deliver an ever-broadening array of services to their subscribers' or customers' homes or other premises. Whereas once a digital subscriber line (DSL) was used solely to provide subscribers with Internet Web and e-mail access, today's service providers wish to bundle Internet service with voice (telephony) and video (television) services. (Such bundled Internet, voice and video service is sometimes colloquially referred to as "triple play" service.) Optical fiber-based technologies, such as the passive optical network (PON), offer perhaps even more promising alternatives to DSL. Fully optical networks, which some have referred to as "fiber-to-the-premises" (FTTP), are increasingly being developed and deployed.

As the complexity and value of digital services have increased, so has the need for security and convenience. The longstanding username-and-password login procedure for providing network security is increasingly considered unacceptable. More automated authentication alternatives have been proposed, and the IEEE 802.1x standard for port-based network access control has emerged as the most popular. "Authentication" refers generally to the process by which a network verifies that a client device attempting to access the network is authorized to access the network and blocks access if the authentication process indicates that the client device lacks authorization.

A service provider wishing to offer a new or additional service that was not previously available via its network may need to add physical devices to the network and otherwise configure the network to support the new service. For example, a service provider that offers only Internet access may wish to offer its customers television programming in addition to the Internet access. To do this, the service provider may need to add some hardware and software elements to its network.

One option for adding a new service would be for the service provider to modify its existing equipment to support the new feature or purchase new equipment that supports the new feature. In the case of a DSL network, the equipment might reasonably be the digital subscriber line access multiplexer (DSLAM) or, in the case of a PON, the optical line terminator (OLT) or optical network terminator (ONT), as each such device defines the access node through which the subscribers' devices (commonly referred to as customer premises equipment or CPE) access the network. Although modifying existing equipment or obtaining new equipment is one possible solution, it may not be the most economical. For example, the benefits of modifying the DSLAMs or OLTs in a typical network of this type may not outweigh the cost if there is insufficient customer demand for the new service.

Another option for adding a new service is for the service provider to add new equipment that supports the new feature and works in conjunction with the existing network equipment. In the case of a DSL network, the new equipment might need to be disposed in the path between the customer premises and the digital subscriber line access multiplexer (DSLAM) or, in the case of a PON, between the customer premises and the optical network terminator (ONT). In such an instance, data packets transmitted between the DSLAM (or OLT, etc.) and the customer premises would need to pass through the new equipment (which is commonly referred to, as a "service node"). As with any network device, it would be desirable to perform authentication when this new equipment is to be used, to ensure that it is connected to the type of device with which it needs to work in conjunction and also that it is in fact the service provider's equipment or otherwise authorized by the service provider and is not some unauthorized equipment that has been connected to the network. It would also be desirable for equipment connected in this manner to not interfere with the network's normal authentication of the CPE. The present invention addresses these problems and deficiencies and others in the manner described below.

SUMMARY OF THE INVENTION

The present invention relates to a service node that authenticates a service provider network to which it is connected. When the service node is connected between subscriber devices and a network node of the service provider network it issues an authentication request to the network node. The network node responds to the authentication request by transmitting a reply. The service node receives the reply and determines if it indicates the service provider network to which the service node is connected is authentic. The request and reply can conform to, for example, the Extensible Authentication Protocol (EAP). Thus, rather than the conventional (e.g., IEEE 802.1x) authentication process by which a network authenticates a device connected to the network, in the present invention the "inverse" occurs: the device, i.e., the service node, authenticates the network. In this manner, the service node is operable only with an authentic network and not with other networks.

Once the network has been authenticated, the service node transparently passes data to be communicated between the network and subscriber devices and also performs whatever other operations it may be intended to perform (i.e., if the service node is added to a network in order to provide a new service, such as video-on-demand or Internet Protocol telephony, it also performs operations relating to that service). The service node transparently passes any data relating to conventional authentication of customer premises equipment (CPE) by the network. Thus, the service node does not interfere with the normal process by which the network authenticates subscriber devices. If the service node determines that the service provider network is not authentic, it blocks communications between the network and subscriber devices.

DETAILED DESCRIPTION

Figure 1:
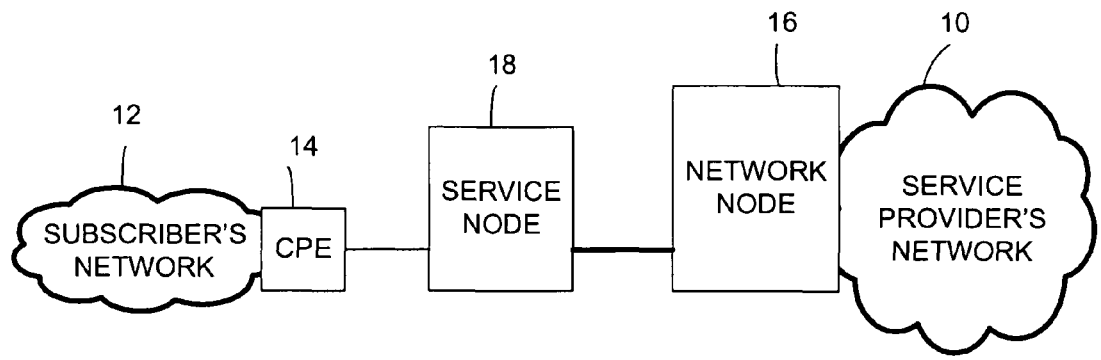
FIG. 1 is a generalized block diagram of a digital network of a type that carries data between a service provider and a subscriber.

As illustrated in FIG. 1, in an exemplary embodiment of the invention, a service provider (business entity) operates a service provider network 10 that provides subscribers with, for example, one or more of the following services: Internet (Web and e-mail) service, voice (telephony) communication, and video (television) entertainment. The subscribers are commonly referred to as "customers" of the service provider, as they typically pay the service provider for such services in accordance with a suitable arrangement. Each subscriber, who can be a homeowner, business, or other person or entity, has a subscriber network 12.

Subscriber network 12 can be a local area network (LAN) in a residence or other premises. Subscriber network 12 networks together various subscriber-operated devices, such as computers, (television) set-top boxes, voice-over-Internet Protocol (VoIP) telephones, IP fax machines, etc., (not shown individually for purposes of clarity). Customer premises equipment (CPE) 14 links or connects subscriber network 12 to service provider network 10. CPE 14 can comprise, for example, a device commonly referred to as a residential gateway, or any other suitable device through which subscriber-operated devices communicate with service provider network 10. CPE 14 is typically provided by or at least pre-approved by the service provider and thus considered "authorized" equipment. Thus, in operation, service provider network 10 performs authentication upon CPE 14 in the conventional manner to verify that it is the expected authorized equipment and not some other (unauthorized) equipment that has been connected in place of CPE 14. This authentication process can conform to the well-known IEEE 802.1x authentication protocol.

Service provider network 10 includes a network node 16 and a service node 18. Service provider network 10 can include many more network nodes 12, service nodes 14, and other equipment of the type that is commonly included in such a network, but only one network node 16 and one service node 18 are shown for purposes of clarity.

Service node 18 can perform any suitable functions or processes in addition to those described herein with regard to the present invention, and the service provider can include it in network 10 as an adjunct to network node 16 for any reason. One reason might be, for example, to add a new service to those already provided by network 10, where the service provider prefers not to modify existing equipment such as network node 16. In such an instance, the service provider may opt to augment the capabilities of network node 16 by adding service node 18, which enables network node 16 or associated elements of network 10 to effect the new service. It is known in the art to add a service node to augment existing network capabilities; therefore, this aspect of service node 18 is not described in detail herein. As indicated above, the new service can be, for example, one or more of the so-called "triple play" services: Internet access, voice communication, and video (television) entertainment.

Network node 16 can be, for example, a digital subscriber line access multiplexer (DSLAM). In embodiments involving other access technologies or network technologies it could be any other suitable type of network node, such as an optical network terminator (ONT). Service node 18 can be geographically located anywhere in the network between network node 16 and customer premises equipment 14. Note that data packets transmitted between network node 16 and customer premises equipment 14 must pass through service node 18. The present invention advantageously does not interfere with data passing through in this manner, once authentication has been completed.

Figure 2:
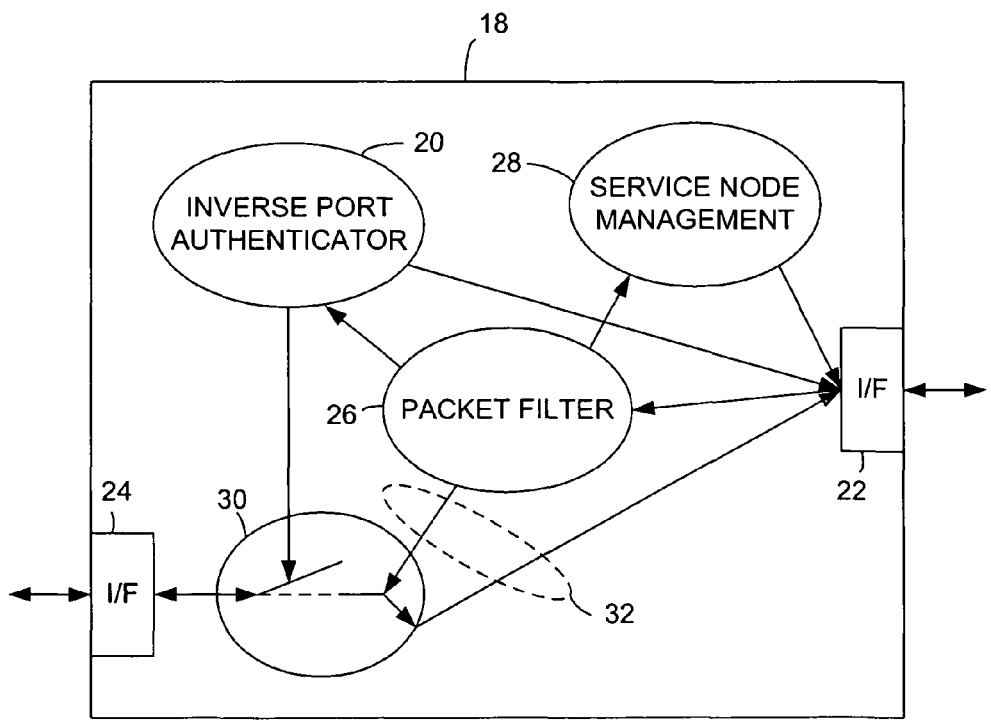
FIG. 2 is a generalized block diagram of a portion of a service node of the network of FIG. 1.

As illustrated in FIG. 2, service node 18 can comprise an inverse port authenticator 20, a service provider network interface 22, a subscriber network interface 24, a packet filter 26, service node management logic 28, a logical switch 30, and other logic 32. Although "other logic" 32 is not part of the authentication system to which the present invention relates, it represents logic needed to assist with providing the service with which service node 18 is primarily associated. Such service node logic for assisting with providing a new service, such as Internet access, voice communication, or video entertainment, is well-understood in the art and therefore not described herein. Each of elements 20, 22, 24, 26, 28 and 30 can comprise "logic," i.e., hardware, software, firmware, or some combination thereof, including data storage. For example, in the exemplary embodiment, at least inverse port authenticator 20, packet filter 26, service node management logic 28 and logical switch 30 can all comprise software elements operating on computer hardware of the type that is commonly included in network nodes. Although not shown for purposes of clarity, service node 18 accordingly includes one or more processors, memories, and other such computer-related hardware and associated software and other logic. Note that in such embodiments of the present invention, the computer-usable code or similar logic, as stored in memory for execution or otherwise carried on a computer-usable medium (e.g., a storage disk), represents a "computer program product." Persons skilled in the art to which the invention relates will readily be capable of creating or otherwise providing the logic for such embodiments in view of the teachings herein, such as by writing software code.

Figure 3:
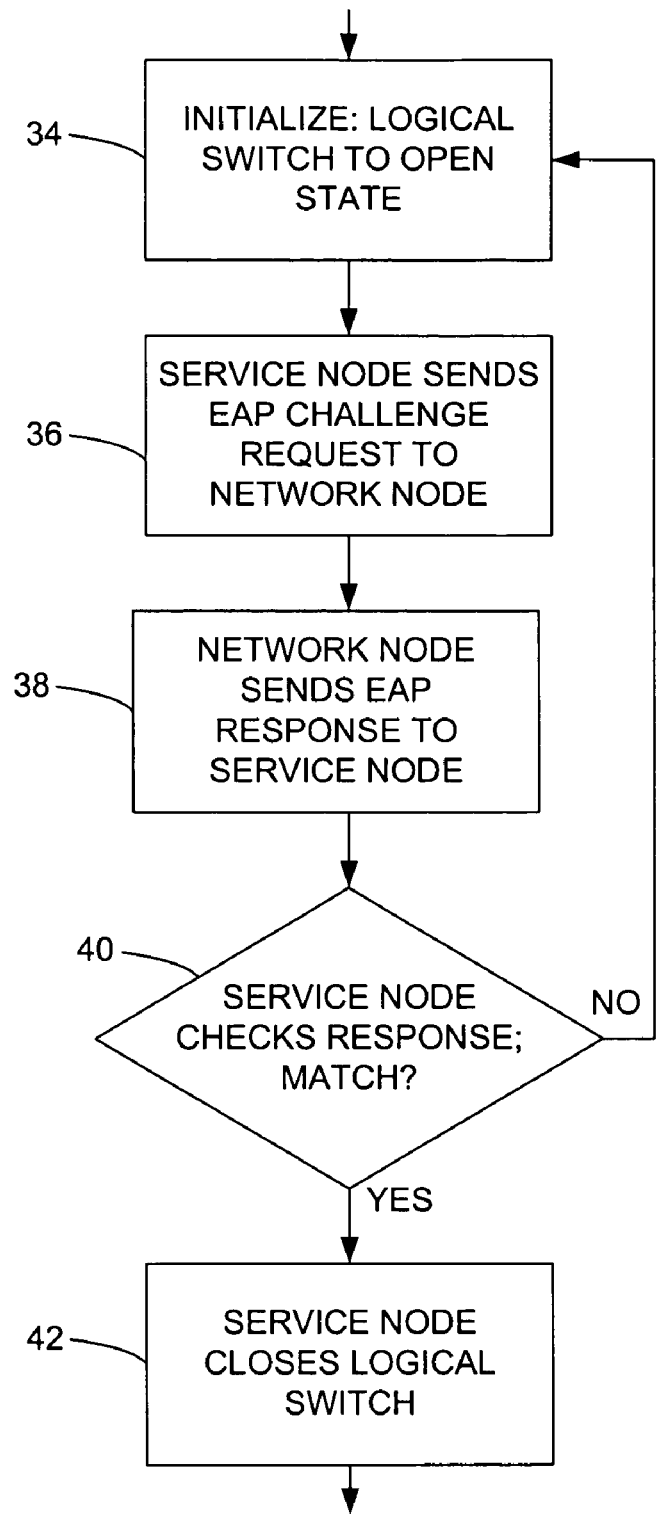
FIG. 3 is a flow diagram illustrating a method by which the service node authenticates the service provider service provider network to permit data communication between the subscriber's network and the service provider network.

To use the illustrated embodiment of the invention, one connects service provider interface 22 to service provider network 10 via network node 16 and connects subscriber network interface 24 to subscriber network 12 (via CPE 14), as indicated in FIG. 1. Inverse port authenticator 20 controls the authentication method described in further detail below. Packet filter 26 filters data packets received from service provider network 10 and allows only those downstream packets that are destined (as may be indicated by a packet address or other indication of destination) for service node management logic 28 or inverse port authenticator 20; it blocks or filters out all other data packets. Logical switch 30 can assume (in a logical rather than physical sense) one of two switch-like states: open and closed. In the closed state (indicated by dashed line), it allows data packets received via service provider interface 22 to pass through to subscriber interface 24 and data packets received via subscriber interface 24 to pass through to service provider interface 22. In the open state, it blocks such data packets from passing through. Inverse port authenticator 20 controls the opening and closing of logical switch 30. Persons skilled in the art to which the invention relates will understand that logical switch 30 can be embodied in any suitable manner and may include aspects of a data structure, filter, data buffer or other logic. Operation of the system is now described with reference to the flow diagram of FIG. 3.

At step 34, any initializations that may be needed by elements of service node 18 are performed, such as opening logical switch 30. Step 34 can be performed at any suitable time, such as when service node 18 is initially connected between service provider network 10 and subscriber network 12 or when some element of one or both networks is re-booted, powered-up, or otherwise re-initialized. At step 36, inverse port authenticator 20 generates an Extensible Authentication Protocol (EAP) Access Challenge Request and causes service node 18 to send it to network node 16. In effect, service node 18 is attempting to authenticate the network 10 to which it is connected and of which network node 16 is a part. In accordance with EAP, at step 38, network node 16 responds to the Challenge Request by sending an EAP Challenge Response to service node 18. At step 40, inverse port authenticator 20 determines if this EAP Response matches the response that is expected from an authentic or authorized network node. The match can be determined by means of any of a number of well-known conventional network authentication algorithms, such as MD5 and SHA, which involve decryption using a key, or by any other suitable method. Both MD5 and SHA are compatible with EAP. If the Response matches what is expected, thereby indicating that network node 16 is authentic, inverse port authenticator 20 causes logical switch 30 to assume a closed state at step 42.

The above-described authentication method of the present invention conforms to EAP, but the network does not authenticate the connected device as in the conventional use of EAP; rather, the "inverse" occurs: the connected device (i.e., service node 18) authenticates network node 16. The use of aspects of EAP and IEEE 802.1x in authenticating network 10 is efficient because these protocols are already implemented in existing (i.e., prior to the addition of service node 18) network nodes 16.

Once service node 18 has authenticated network node 16 as described above, communications can occur in the normal manner between service provider network 10 and subscriber network 12. Data packets pass through service node 18 unimpeded because logical switch 30 is closed. Thus it can be appreciated that subscribers can only obtain the benefits of service node 18 (e.g., access to a new service) if service node 18 is connected to the authentic network 10.

Referring again to FIG. 2, note that regardless of whether authentication has yet been performed, service provider network 10 can communicate with service node management logic 28. This feature allows the service provider to check the status of service node 18 for proper operation, install, update and maintain its software, and perform other tasks.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A service node comprising:
   a network interface connectable to a network node for forwarding authentication requests to the network node;
   a subscriber interface connectable to subscriber devices for forwarding data to subscribers;
   authentication logic for initiating an authentication request that is forwarded to the network node through the network interface, receiving a reply to the authentication request from the network node through the network interface, and determining whether the network node is authentic from the reply;
   a switch configured to allow data, communicated between the network interface and the subscriber interface, to pass through the switch provided the network node is authentic; and
   a packet filter for filtering out downstream packets not associated with authenticating subscriber devices or authenticating the network node.

2. The service node claimed in claim 1, further comprising service node management logic accessible to a service provider network associated with the network node regardless of whether the network node has been authenticated.

3. The service node claimed in claim 1, wherein the authentication request and reply conform to Extensible Authentication Protocol (EAP).

4. A method for operating a service node comprising:
   the service node initiating and forwarding an authentication request to a network node;
   the service node receiving a reply to the authentication request from the network node;
   the service node determining whether the network node is authentic; the service node allowing data to pass between the network interface and subscriber interface provided the network node is authentic; and
   a packet filter filters out downstream packets not associated with authenticating subscriber devices or authenticating the network node.

5. The method claimed in claim 4, wherein P1 the service node permits access by a service provider network associated with the network node to management logic of the service node regardless of whether the network node has been authenticated.

6. The method claimed in claim 4, wherein the authentication request and reply conform to Extensible Authentication Protocol (EAP).

7. A tangible computer program product comprising:
   a memory for storing code portions for execution by a processor;
   a first code portion for initiating and forwarding an authentication request to a network node;
   a second code portion for receiving a reply to the authentication request from the network node;
   a third code portion for determining whether the network node is authentic; and
   a fourth code portion for allowing data to be passed between a network interface and a subscriber interface provided the network node is authentic; and
   comprising a fifth code portion for filtering out downstream packets not associated with authenticating subscriber devices or authenticating the network node.

8. The computer program product claimed in claim 7, further comprising a sixth code portion for permitting access by a service provider network associated with the network node to management logic of the service node regardless of whether the network node has been authenticated.

9. The computer program product claimed in claim 7, wherein the authentication request and reply conform to Extensible Authentication Protocol (EAP).

* * * * *